UNITED STATES PATENT OFFICE.

LUDWIG BENDA, OF FRANKFORT-ON-THE-MAIN, GERMANY, ASSIGNOR TO FARBWERKE VORM. MEISTER LUCIUS & BRÜNING, OF HÖCHST-ON-THE-MAIN, GERMANY, A CORPORATION OF GERMANY.

MANUFACTURE OF HOMOLOGUES OF PARA-AMINOPHENYLARSINIC ACIDS.

No. 913,940.     Specification of Letters Patent.     Patented March 2, 1909.

Application filed July 13, 1908. Serial No. 443,383.

*To all whom it may concern:*

Be it known that I, LUDWIG BENDA, Ph. D., a citizen of the Empire of Germany, residing at Frankfort-on-the-Main, Hesse-Nassau, Prussia, Germany, have invented certain new and useful Improvements in the Manufacture of Homologues of the Para-Aminophenylarsinic Acids, of which the following is a specification.

I have found that by heating with arsenic acid aromatic amins in which the para-position to the amino group is occupied by hydrogen, for example orthotoluidin, metatoluidin and paraxylidin, besides colored products resulting from oxidation of the amins, homologues of p-aminophenylarsinic acid are also produced. By choosing suitable conditions a considerable part of the aromatic amins may even be transformed into the arsinic acids.

The new compounds are white crystallizing bodies, readily soluble in hot water, which form with alkalies and alkalicarbonates crystallizing salts; they are difficultly soluble in alcohol, in ether and benzene they are insoluble. By dilute hydrochloric acid they are precipitated from concentrated solutions of their alkali salts. When treated with nitrous acid they are transformed into diazo compounds. When heated, they melt at a high temperature and decompose. They can be used for the same purpose and in the same manner as atoxyl and serve moreover as parent materials for manufacturing other compounds for medical purposes.

The procedure for manufacturing the new compounds may for instance be as follows: In a stirring vessel which is placed in an oil bath, 90 kg. of o-toluidin are heated. When the internal temperature has risen to 50°, 24 kg. of powdered arsenic acid are gradually added while stirring and further heating. The heating is continued while constantly stirring in such a manner that after about one hour the internal temperature amounts to 165–168°; then water and some toluidin is distilling off; the temperature of the oil bath is further increased and kept for one hour so that the internal temperature amounts to 185–190°. Now the mixture is allowed to cool and at about 150° the contents of the vessel is pressed into cold water; then it is neutralized with caustic soda lye and made strongly alkaline by milk of lime whereupon the excess of toluidin is distilled off with steam. The remaining liquid is saturated with common salt and filtered off after 24 hours. To the filtrate so much of concentrated hydrochloric acid is added that methylorange becomes slightly reddened; there will then separate at first a by-product in a resinous form. Solution separated from this resin is allowed to stand for 20 hours or for a longer time, whereupon the amino-ortho-tolylarsinic acid crystallizes. In order to purify it, the raw product is dissolved in a little hot water with the quantity of caustic soda lye necessary for exact neutralization, and the solution—which may eventually be treated with some animal charcoal—is mixed with a 1½ times its volume of alcohol.

The sodium salt turns out crystalline; it is very readily soluble in water, rather difficultly soluble in alcohol, but insoluble in benzene and ether. From the concentrated aqueous solution of the sodium salt, the free amino-ortho-tolylarsinic acid may be eliminated by the addition of hydrochloric acid. It crystallizes from hot water in the form of needles which melt at 194–195°; they are difficultly soluble in alcohol, insoluble in benzene and ether, readily soluble in an excess of dilute acids and in alkalies and alkalicarbonates. The amino-ortho-tolylarsinic acid can be diazotized and combined to form dyestuffs which resemble the corresponding sulfanilic acid dyestuffs.

The constitution of the aminotolylarsinic acid obtainable from orthotoluidin corresponds to the formula:

and its formation may be explained by the equation:

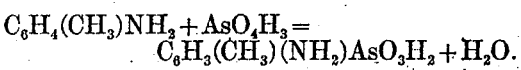

If metatoluidin and paraxylidin are used instead of the ortho-toluidin, the amino-metatolylarsinic acid:

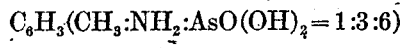

and the amino-paraxylylarsinic acid

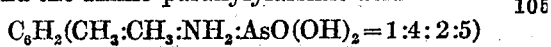

are produced which are very similar to the amino-ortho-tolylarsinic acid and which melt at 180 and 215° respectively.

Claims.

1. The process of manufacturing the homologues of para-aminophenylarsinic acid, which consists in heating with arsenic acid the homologues of the anilin in which the para position to the amino group is occupied by hydrogen.

2. As new products, the homologues of amino-phenylarsinic acid, the constitution of which corresponds to the general formula: $C_6H_{4-n}(CH_3)_n:NH_2:AsO(OH)_2$, and which contain the group $AsO_3H_2$ in para position to the amino group, being white crystalline compounds which are readily soluble in hot water, more difficultly soluble in cold water, difficultly soluble in alcohol, insoluble in benzene and ether, melting at from 180° to 215° C., forming with alkalies, alkali-carbonates, or an excess of dilute mineral acids, readily-soluble salts, and being diazotized by nitrous acid.

3. As a new product, amino-ortho-tolylarsinic acid, the constitution of which corresponds to the formula:

$$C_6H_3(CH_3:NH_2:AsO(OH)_2 = 1:2:5),$$

being a white compound, crystallizing in the form of needles which are readily soluble in hot water, more difficultly soluble in cold water, difficultly soluble in alcohol, insoluble in benzene and ether, melting at 194–195° forming with alkalies, alkalicarbonates, of an excess of dilute mineral acids, readily soluble salts, and being diazotized by nitrous acid.

In testimony whereof, I affix my signature in presence of two witnesses.

LUDWIG BENDA.

Witnesses:
CARL GRUND,
JEAN GRUND.